United States Patent
Lopez-Ordaz

(12) 
(10) Patent No.: US 6,272,879 B1
(45) Date of Patent: Aug. 14, 2001

(54) LIQUID CHILLING SYSTEM

(76) Inventor: Oscar-Raul Lopez-Ordaz, Puerto Cortez 913, Residencial Riviera, San Nicolás de los Garza, Nuevo León (MX), 66490

(*) Notice: Subject to any disclaimer, the term of this patent is extended or adjusted under 35 U.S.C. 154(b) by 0 days.

(21) Appl. No.: 09/630,921

(22) Filed: Aug. 2, 2000

(51) Int. Cl.$^7$ ............................................. F25D 3/02
(52) U.S. Cl. ............................................. 62/318; 62/376
(58) Field of Search ........................... 62/318, 317, 375, 62/376, 373, 63, 237, 457.1, 457.3, 457.4, 457.9

(56) References Cited

U.S. PATENT DOCUMENTS

| | | | |
|---|---|---|---|
| 2,214,009 | * | 9/1940 | Boester, Jr. . |
| 4,752,389 | * | 6/1988 | Burrows . |
| 5,184,471 | | 2/1993 | Losacco et al. ............... 62/63 |
| 5,423,191 | | 6/1995 | Bennett ........................ 62/201 |
| 5,584,187 | | 12/1996 | Whaley ........................ 62/237 |
| 5,611,937 | * | 3/1997 | Jarocki . |

* cited by examiner

*Primary Examiner*—Henry Bennett
*Assistant Examiner*—Chen-Wen Jiang

(57) ABSTRACT

A portable liquid chilling system for chilling and disinfecting the liquid of each and every independent desired container, comprising: a refrigeration unit, a pipe having an intake liquid section, taking the liquid from a container, a liquid cooling section held to and passing trough said refrigeration unit, for chilling the liquid circulating through said liquid cooling section, and a liquid returning section, for returning the chilled liquid to said container; a liquid pump connected to the flexible pipe, for pumping the liquid from the container, through the pipe and returning it to the container; a bactericide dispenser connected to the pipe for dispensing a bactericide substance to the liquid, and a liquid filter connected to the pipe, for filtering and retiring any solid form the liquid.

12 Claims, 1 Drawing Sheet

LIQUID CHILLING SYSTEM

BACKGROUND OF THE INVENTION

A. Field of the Invention

This invention relates to a liquid chilling system and more particularly to a water chilling and disinfecting system for chilling and disinfecting the water of any kind of independent container, and disinfecting the container itself.

B. Description of the Related Art

The method for chilling beverages or food containers by means of chilled water or other liquids is well known and recognized for its quick heat interchange rates. Such method is incorporated to equipment for chilling bottles of beverages contained in a refrigerator forty years ago, but it was discarded due to serious hygienic problems.

The above-referred chilling equipment was constituted by a thermally insulated container including a refrigeration unit including an evaporator is comprised by a copper pipe attached into the container and submerged in the water to be chilled. The water was circulated through the evaporator by a propeller driven by an electric motor in order to chill the water. Normally, the water remained into the container for months without be changed, thus becoming an optimum agent for the growth of harmful microorganisms, specially when the content of a bottle was spilled in the water.

The above-referred hygienic problems lead to the discouraging of the use of said equipment by the Wealth Secretary in Mexico during a cholera epidemics.

One chilling system for cooling a food product into a container is disclosed in the U.S. Pat. No. 5,184,471 of Lossaco, which comprises a rotary container for receiving and holding the food product, a cooling station for cooling a liquid coolant, an ultraviolet radiation station for reducing the microbial contaminants in the coolant, and a circulation system for circulating the coolant from the cooling station to the container, from the container to the ultraviolet radiation station, and from the ultraviolet radiation station to the cooling station for reintroduction into the container for cooling additional food products.

As It was previously described, Lossaco system includes a rotary container by which it is expected to be achieved a continuous cooling process, however, the container can not be used to hold delicate food or beverage packages such as crystal bottles of carbonated beverages due to the high risk of damaging the container or even destroying it, which would be the case of the crystal bottles. Furthermore, even if it is used a PET or aluminum container for carbonated beverages, the continuous movement of said containers will lead to an important carbonate loose of the beverage, which would reduce the quality is taste of the product and in extreme cases, the continues movement will produce the explosion of the container due to the high pressure created by the carbonate into the container. Another disadvantage of Lossaco system is it high cost, mainly because it uses complicated and costly equipment, which is very difficult to use at a food selling point such as a mini market.

Another chilling system is disclosed in the U.S. Pat. No. 5,423,191 of Bennet, which comprises: a special receiving chamber, a plurality of horizontally positioned refrigerant cooling lines in the bottom of said chamber, a body of liquid in said chamber having an equal volume or less than the volume of said chamber, said liquid being cooled by said refrigerant cooling lines, a refrigerant compressor/thermal electric unit, connected to said refrigerant cooling lines, an electric pump located in a corner of said chamber, for constantly circulating said body of liquid throughout said chamber over said refrigerant cooling lines, a tubing dispensing system connected to said pump that directs said cooled liquid onto and in between blood containers and/or other objects disposed within said receiving chamber, further comprising a transfer hose that transfers said cooled liquid from the vicinity of said pump to the opposite end of said chamber and a dispensing tube at the bottom of said chamber with circulation holes pointed toward the pump end of said chamber, a device for sensing water temperature in said chamber, a compressor temperature thermostat control which controls said refrigerant compressor/thermal electric unit to constantly maintain the temperature of said liquid to be 2° C. to 6° C., and a filtering means in the path of the cooled liquid to kill and remove bacteria, organic, and organic chemical material from said cooled liquid.

Bennet apparatus needs a specially designed receiving chamber having cooling lines connected to a refrigerant compressor, therefore, it is very difficult to adapt Bennet apparatus to use it with any other container. Furthermore, Bennet discloses the use of filtering means which disinfect the water that it is circulated throughout the receiving chamber, however if the receiving chamber is not disinfected before filling it with water, the water would remain infected since the disinfected water coming out form the filter would make contact again with the infected walls of the chamber.

U.S. Pat. No. 5,584,187 of Whaley, discloses a beverage chiller comprising: a refrigeration plant for chilling a liquid medium, said refrigeration plant including a chilling medium circuit and means defining a chilling medium supply port for discharging said chilling medium; multiple portable storage receptacles for receiving and storing food containers and said liquid chilling medium in heat exchange relation to said food containers placed therein, each of said multiple storage receptacles comprising a bottom wall and upstanding lateral walls enclosing a plurality of partitions arranged abreast for separating each said storage receptacle into at least three compartments, and at least one brace straddling said plurality of partitions for maintaining said partitions in place; said storage receptacle having means defining an inlet port for receiving said liquid chilling medium from said refrigeration plant; and means for manually enabling and disconnecting fluid communication between said supply port and said storage receptacle, whereby each said portable storage receptacle can be maintained at a chilling temperature while connected to said refrigeration plant and transported away from said refrigeration plant in a chilled condition to is another location.

Whaley beverage chiller cannot be adapted to all types of containers such as ices boxes, and it is not portable. Therefore, the containers must be transported to the place where it is installed the refrigeration plant in order to be connected thereto, and then transport the container full of the cooling medium to the point at which it will be used. In order to chill again the cooling medium, the container must be transported and connected to the refrigeration unit, which is not practical.

Furthermore, Whaley does not disclose the use of a water disinfecting system, which is important in order to avoid the infection of the beverage or food containers.

U.S. patent of Heuvel discloses a portable cooling device for serving large quantities of capped buoyant beverages to patrons and equipped with an insulated bulk liquid holding tank and a high mechanical capacity to rapidly cool a bulk coolant confined within said holding tank, said cooling device comprising a carrying frame for supporting the holding tank, a hitch assembly for hitching the device to a towing vehicle, wheels for transporting the device with the towing vehicle, means for partitive retainment of capped buoyant beverages within said tank in a systematic relationship, cooling means rated at a cooling capacity of at least 1,000 B.T.U. for each 100 gallon holding capacity of said tank for rapidly cooling the liquid coolant and said capped buoyant beverages within said holding tank, and accessing means for emplacing and removing capped beverages from said means for partitive retainment.

Heuvel system is a refrigeration unit having its own container—which raises is the weight of the equipment-functioning in a systematic relationship with the refrigeration unit, which can not be separated in order to be adapted to another container. Therefore, the whole unit must be transported to the place where it will be used.

Considering the above-referred problems, applicants developed a portable liquid chilling system having water disinfecting means, which can be used to chill and disinfect the water of any kind of independent container.

Applicants liquid chilling system comprises, in accordance with the present invention: a support frame including a support base; cooling means held by said support base; liquid conducting means attached to the support base of the support frame, including a liquid intake section to be connected to an independent liquid container, a liquid cooling section, attached to and passing through said cooling means, for chilling the liquid circulating through said chilling section, and a liquid returning section, for returning the chilled liquid, to the container, pumping means connected to the liquid conducting means, for pumping the liquid taken from the container by the liquid taking section of the liquid conducting means, passing trough the cooling means and returning the chilled liquid to a container by the liquid returning section of said liquid conducting means; liquid disinfecting means, connected to the liquid conducting means, for dispensing a predetermined amount of a bactericide substance to the liquid and, consequently, to the container, in order to disinfect the water and the container at the same time; and filtering means connected to the liquid conducting means, in order to filter and retire any solid form the liquid and avoid the plugging of the liquid conducting means.

Also, it can be added an antifreeze agent, in order to lower the freeze point and obtain liquid temperatures below 0° C. in order to freeze the items in contact with the liquid.

Applicants liquid chilling system is completely portable, and can be easily transported from one container to another container in order to chill and disinfect the water of a plurality of containers without the need of moving said containers to the refrigerating unit. Thus, all the containers actually in use at the mini markets for example, such as iceboxes, can be used, avoiding the acquisition of heavy and expensive refrigeration equipment, and avoiding the disposition of said containers which in the case of ice boxes, represent tons of non biodegradable plastic, worldwide, which would have a serious and negative impact to the environment.

Among other important applications of the liquid chilling system of the present invention are:

Processing, conservation or transportation of food.
Conservation or transportation of biochemical, pharmaceutical, or metallurgic samples.
Conservation or transportation of live specimens such as fish, or vegetables including hydroponic samples.
Conservation, or transportation of live biological samples such as tissues, corporate fluids, skin cells, human or animal organs, semen, ovules, etc.
Heat interchange applications for cooling machinery with any kind of liquids, including exothermic chemical reactors temperature control.
Medical therapy applications in which it is necessary to fresh or cool all or only certain parts of the human body for therapy or major surgery.
Conservation or transportation of raw or processed food products, with or without individual packages.
Use for outdoors activities, such as camping, fishing, hunting, etc., for cooling food and beverages.

And last but not least, with the liquid chilling system of the present invention, a fast liquid cooling rate is achieved without the need of additional equipment or without the addition of ice.

SUMMARY OF THE INVENTION

It is therefore a main objective of the present invention, to provide a liquid chilling system for chilling and disinfecting the water of any kind of independent container.

It is also a main objective of the present invention, to provide a liquid chilling system for chilling and disinfecting the water of any kind of independent container by taking the liquid from said container by means of liquid conducting means, circulating the liquid by pumping means through refrigeration means of the liquid chilling system and then returning the chilled water to the container by said pumping means.

It is another objective of the present invention, to provide a liquid chilling system having bactericide dispensing means for dispensing cleaning and bactericide substances to the liquid conducting means, in order to disinfect the water and consequently the container at the same time.

It is a main objective of the present invention to provide a liquid chilling is system which is completely portable and which can be easily transported from one independent container to another independent container in order to chill and disinfect the water of a plurality of containers.

It is still another objective of the present invention, to provide a liquid chilling system by which all the containers actually in use, such as plastic iceboxes, can be used, avoiding the acquisition of heavy and expensive refrigeration equipment, and avoiding the disposition of said containers, which would have a serious and negative impact to the environment.

It is still a main objective of the present invention, to provide a liquid chilling system by which it is achieved a fast liquid cooling rate without the need of additional equipment or without the addition of ice cubes.

These and other objects and advantages of the liquid chilling system of the present invention will become apparent to those persons having an ordinary skill in the art, from the following detailed description of the embodiments of the invention, which will be made with reference to the accompanying drawings.

DETAILED DESCRIPTION OF THE INVENTION

Figure 1:
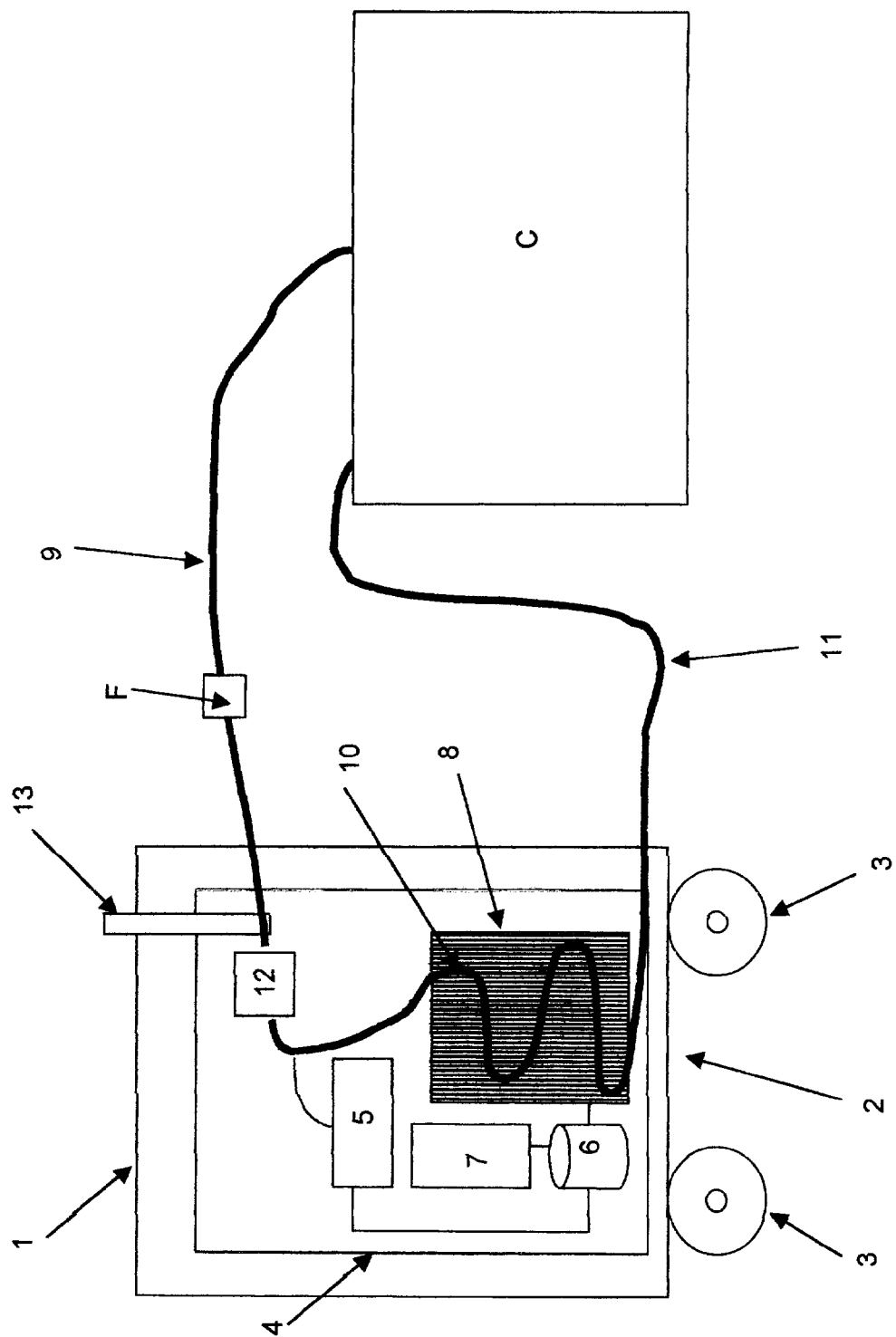
FIG. 1. is an schematic diagram of the liquid chilling system of the present invention, in a preferred embodiment thereof.

The liquid chilling system of the present invention, will now be firstly described in accordance with a preferred embodiment thereof, illustrated in the accompanying drawings wherein the same signs and numbers, refer to the same parts of the shown figures, comprising:

- a support frame (1) including a support base (2), having transportation means comprising one or more pair of wheels (3) attached to the support base;
- cooling means (4) attached to the support base of the support frame, including temperature control means such as a thermostat (5) or a temperature sensor, said cooling means preferably comprising a refrigeration unit having a compressor (6), condenser (7) and an evaporator (8).
- liquid conducting means, including a liquid intake section (9) preferably made of a flexible plastic pipe to be connected to a liquid-filled independent container (C), a liquid cooling section (10), preferably made of a metallic material having accurate heat-interchangeably properties, attached to and passing through the cooling means (4), specifically through the evaporator (8) of said cooling means (4), in order to chill the water passing there-through; and a liquid returning section (11), preferably of a flexible plastic material, for returning the already chilled liquid back to the container (C);
- pumping means, preferably comprising an electric pump (12), connected to the liquid conducting means, preferably to the liquid intake section (9), for pumping the liquid taken from a container (C) by the liquid intake section (9) of the liquid conducting means, passing trough the evaporator (8) of the cooling means (4), and returning the chilled water back to the container (C) by the returning section (11) of said liquid conducting means;
- liquid disinfecting means, preferably comprising a venturi tube (13), connected to the liquid conducting means, preferably to the liquid intake section (9), for dispensing a predetermined amount of a bactericide substance to the liquid circulating through the liquid conducting means and, consequently, to the container (C), in order to disinfect the liquid and the container (C) at the same time; and
- a liquid filter (F) connected to the liquid conducting means, preferably to the liquid intake section thereof, in order to filtering and retire any solid from the liquid and avoid the plugging of the liquid conducting means.

Although it was described that the elements of the chilling system of the present invention such as the cooling means are attached to a movable support frame (1), they can be attached to a static support frame (not shown) or directly attached to a container.

In order to obtain water temperatures below 0° C., it can be added an antifreeze agent together with the bactericide agent directly through the venturi tube (13) of the liquid and container disinfecting means, thus achieving the freezing of the items in contact with the liquid into the container.

Any kind of bactericide agent can be added directly through the venturi tube (13) of the liquid disinfecting means, depending on the items to be cooled into the container (C). Thanks to the fact that the bactericide agent is added directly to the liquid which fills the container (C), it is achieved the disinfection both, of the water and the container (C), at the same time, avoiding the re-infection of the liquid and/or the items in contact with the liquid.

And although it was described that the water and container disinfecting means comprises a venturi tube (13), it can be adapted any kind of device, such as an automatic liquid or powder dispenser device (not shown) in order to program the addition of the bactericide agent or a mix of several bactericide agents together with an antifreeze agent, and achieve optimum operative conditions depending on the items to be chilled or frozen.

In the same way, it can be adapted any king of cooling means, such as adsorption or absorption cooling system which do not require a compressor.

And last but not least, although it was described that the filter (f) is connected to the liquid intake section (9) of the liquid conducting means, alternative it can be connected to the liquid returning section (11).

Finally it must be understood that the liquid chilling system of the present invention, is not limited exclusively to the above described and illustrated embodiments and that the persons having ordinary skill in the art can, with the teaching provided by this invention, be enabled to make modifications to the design and component distribution of the liquid chilling system of the present invention, which will clearly will be within the true inventive concept and scope of the invention which is claimed in the following claims:

What is claimed is:

1. A liquid chilling system for chilling and disinfecting a liquid of a container, comprising:

a support frame;

cooling means attached to the support frame;

liquid conducting means including a liquid intake section for taking liquid from a container, a liquid cooling section attached to and passing through the cooling means, for chilling the liquid passing there-through, and a liquid returning section, in order return the chilled liquid back to the container;

pumping means connected to the liquid conducting means, for pumping the liquid from the container, passing it through the liquid cooling means, and returning it back to the container;

liquid disinfecting means, connected to the liquid conducting means, for dispensing a bactericide substance to the liquid passing through said liquid conducting means, in order to disinfect the water and consequently the container; and filtering means connected to the liquid conducting means, in order to retain and retire any undesirable solid from the liquid circulating through the liquid conducting means.

2. The liquid chilling system according to claim 1, in which the support frame having a support base, and transportation means comprising one or more pair of wheels attached to the support frame.

3. The liquid chilling system according to claim 1, in which the cooling means comprising a refrigeration unit having a compressor, a condenser and an evaporator.

4. The liquid chilling system according to claim 1, in which the cooling means including temperature control means comprising a thermostat.

5. The liquid chilling system according to claim 1, in which the cooling means including temperature control means comprising a temperature sensor.

6. The liquid chilling system according to claim 1, in which the liquid intake section of the liquid conducting means comprising a flexible plastic pipe.

7. The liquid chilling system according to claim 1, in which the liquid cooling section of the liquid conducting means, is comprised of a metallic material having suitable heat-interchangeably properties, forming a path trough the evaporator of a refrigeration unit in order to chill the liquid.

8. The liquid chilling system according to claim 1, in which the pumping means comprising an electric pump.

9. The liquid chilling system according to claim 1, in which the water and container disinfecting means comprising a venturi tube connected at the water intake section of the liquid conducting means, in order to receive a predetermined amount of a bactericide substance to be absorbed by the pumping means through the liquid intake section and to be dispensed to the container trough the liquid returning section of the liquid conducting means to the container in order to disinfect the water and also the container.

10. The liquid chilling system according to claim 1, in which the liquid and container disinfecting means comprising an automatic liquid or powder dispenser device connected to the liquid intake section of the liquid conducting means, in order to program the addition of a bactericide agent to the liquid and container.

11. The liquid chilling system according to claim 1, in which an antifreeze agent is added together with the bactericide agent, in order to lower the freeze point and obtain liquid temperatures below 0° C.

12. The liquid chilling system according to claim 1, wherein the filtering means are connected to the liquid intake section of the liquid conducting means.

* * * * *